United States Patent [19]

Hicks

[11] Patent Number: 4,800,562
[45] Date of Patent: Jan. 24, 1989

[54] CIRCUIT AND METHOD FOR MONITORING THE QUALITY OF DATA IN A DATA STREAM

[75] Inventor: Gregory F. Hicks, Nepean, Canada

[73] Assignee: Northern Telecom Limited, Montreal, Quebec, Canada

[21] Appl. No.: 43,273

[22] Filed: Apr. 27, 1987

[51] Int. Cl.⁴ .................................................. G06F 11/00
[52] U.S. Cl. ............................................................ 371/5
[58] Field of Search ................. 371/5; 375/10; 377/44

[56] References Cited

U.S. PATENT DOCUMENTS

| | | | |
|---|---|---|---|
| 4,053,751 | 10/1977 | Ault | 371/5 X |
| 4,080,589 | 3/1978 | Kline | 371/5 |
| 4,234,953 | 11/1980 | Kline | 371/5 |
| 4,241,445 | 12/1980 | Payen | 371/5 |
| 4,291,403 | 9/1981 | Waddill | 371/5 |
| 4,363,123 | 12/1982 | Grover | 371/5 |
| 4,566,101 | 1/1986 | Skonieczny et al. | 371/5 |
| 4,677,619 | 6/1987 | Kawai | 371/5 |

*Primary Examiner*—Charles E. Atkinson
*Attorney, Agent, or Firm*—F. P. Turpin

[57] ABSTRACT

The invention provides a circuit for monitoring predetermined performance criteria of a transmission link by measuring a predetermined ratio of events in a data stream. A first counter having a predetermined maximum count is responsive to each of periodic predetermined occurrences in the data stream and a clock pulse for also increasing its count by one. A second counter having a predetermined maximum count is responsive to each error of predetermined type in the data stream and a clock pulse for increasing its count by one. The overflow output of the first counter is connected to the clear input of the second counter and the overflow output of the second counter is connected to the clear input of the first counter. A signal appearing at the overflow output of the second counter indicates that the predetermined ratio of events in the data stream has not been met. The circuit also provides turn-on, turn-off hysteresis.

9 Claims, 2 Drawing Sheets

CIRCUIT AND METHOD FOR MONITORING THE QUALITY OF DATA IN A DATA STREAM

BACKGROUND OF THE INVENTION

The invention relates generally to a circuit for monitoring the relationship between a pair of signals and more particularly to a fully digital circuit for monitoring performance criteria of a digital data transmission link.

BRIEF DESCRIPTION OF THE PRIOR ART

One prior art method of improving the quality of a data transmission link has been through the use of automatic gain control in the receivers. Corrective measures are taken when the gain control feedback signal exceeds certain limits. While this method can detect a weak or faded signal, signal distortion due to noise is not identified and may go undetected.

Another method employs the transmission of a known pattern of data as a means for checking the received data for accuracy. Of course, the drawback to this technique is that normal transmissions on the link being checked must be interrupted for transmission of the known pattern.

It is therefore desirable to provide a circuit for the measurement of receive data quality that may be connected on-line with the data link. The output of such a circuit may then be used to raise an alarm flag and corrective action such as commutation of the link, re-transmission request of the data or simply non-reception of garbled data may be taken.

A typical circuit and method of monitoring a digital transmission link is described in U.S. Pat. No. 4,363,123. In that circuit, an error counter is incremented once per a predetermined period if at least one error is detected during the period and is decremented for each error-free period. While this circuit is effective in the control of re-synchronization requests, it does not count the number of errors, nor does it provide an indication of data quality.

Another type of circuit adapted to the monitoring of a digital transmission link is exemplified by U.S. Pat. No. 4,291,403. This type of circuit comprise a single shot monostable circuit and/or timing generators, a counter circuit and various logic gates including comparators and even a relay.

As effective as these circuits may be for their intended use, the suffer from a number of deficiencies. Since the circuits are driven by a source of error pulses only they are incapable of providing a continuous data quality indicator. They also tend to be relatively expensive and require analog type components (e.g. capacitors) which make the total integration of the circuit difficult.

SUMMARY OF THE INVENTION

With the proliferation of digital systems such as ISDN (Integrated Services Digital Network) it is becoming imperative that any circuit used those systems be economical and fully digital.

It is therefore an object of the invention to provide a circuit for monitoring the performance of digital data transmission which is simple, economical and fully digital so that it may be conveniently integrated.

In accordance with the invention, there is provided an event ratio detector circuit comprising a first counter having a predetermined maximum count and being responsive to each event of a first sequence of events for increasing its count by one, and a second counter having a predetermined maximum count and being responsive to each event of a second sequence of events for increasing its count by one. The overflow output of the first counter is connected to the clear input of the second counter and the overflow output of the second counter is connected to the clear input of the first counter. A signal appearing at the overflow output of the second counter is connected to the the ratio of second events to first events as predetermined by the respective maximum counts of the second and first counters has been exceeded.

The circuit of the invention may be used as a performance monitor in a data receiver circuit adapted to receive a digital data stream on a transmission link wherein the receiver circuit comprises a signal generator adapted to provide a periodic bit corresponding to each one of predetermined occurrences in the data stream, an error detector circuit adapted to provide an error bit corresponding to each error of a predetermined type detected in the received data and a source of clock pulses synchronized to the bits of the data stream. The monitoring circuit comprises a first counter means having a predetermined maximum count and which is responsive to each of the periodic bits and a clock pulse for increasing its count by one. It further comprises a second counter means having a predetermined maximum count and which is responsive to each error bit and a clock pulse for increasing its count by one. The overflow output of the first counter means is connected to the clear input of the second counter means and the overflow output of the second counter means is connected to the clear input of the first counter means. A signal appearing at the overflow output of the second counter means represents a data quality indication to the data receiver circuit.

From another aspect, the invention provides a method for measuring a predetermined ratio of events in a data stream and thus determine if the predetermined performance criteria of a transmission link are met.

The circuit of the invention runs continuously to provide a data quality indication and provides turn-on, turn-off hystereris. That is, an alarm flag is raised as soon as an error threshold is reached and is not removed until a predetermined amount of error-free data has been received. The alarm flag may be used to suspend reception of further data until the monitoring circuit indicates that the received data meets the predetermined criteria of quality or to commutate the data link to an alternate path.

DETAILED DESCRIPTION

Figure 1:
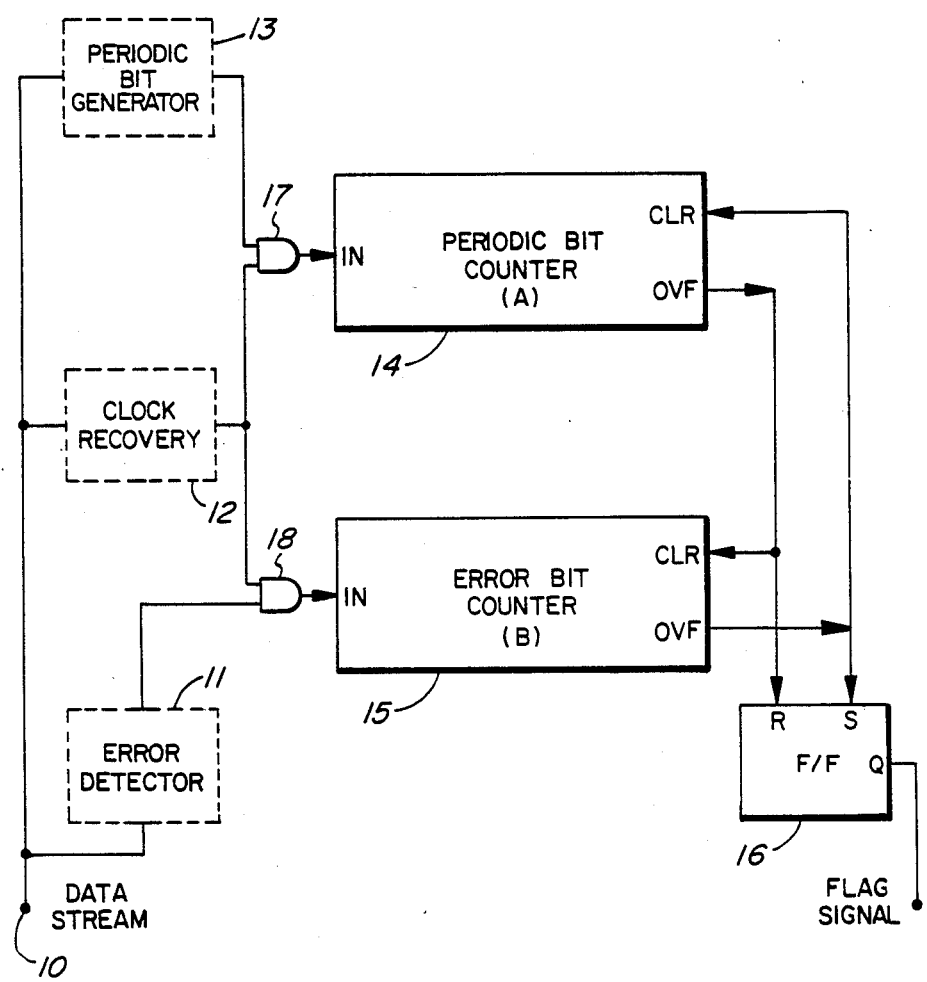
Figure 2:
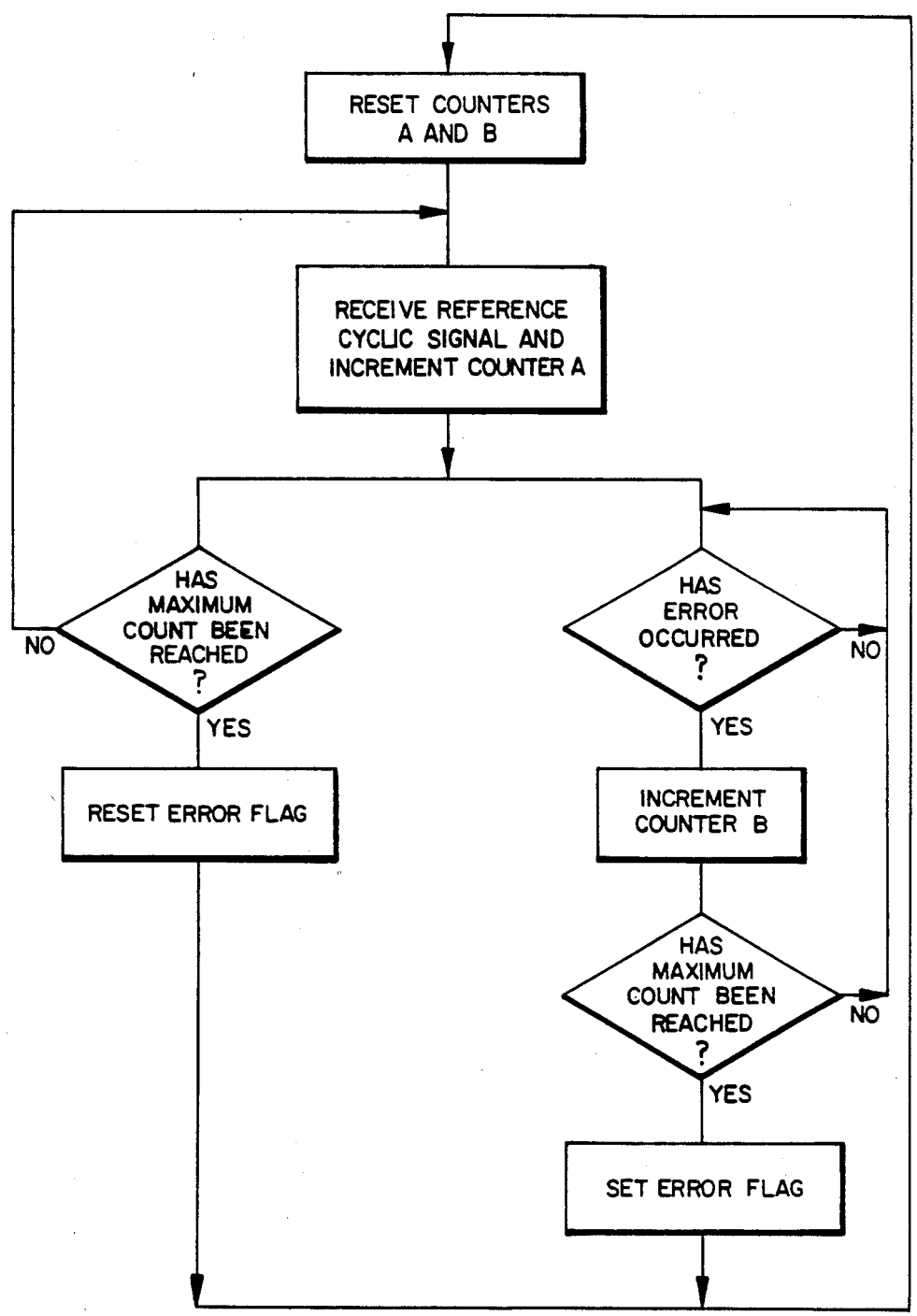

An example embodiment of the invention will now be described in conjunction with the drawings in which:

FIG. 1 is a schematic diagram of a circuit in accordance with the invention; and FIG. 2 is a flowchart illustrating the operation of the circuit of FIG. 1.

FIG. 1 shows an input terminal 10 to which may be connected a digital data stream from a transmission link. The data on the link may be partitioned using any method compatible with the receiver. Any such data stream may conventionally be partitioned into frames and sub-frames and may contain parity bits as well as error checking codes such as, for example, cyclic redundancy codes (CRC).

A data receiver usually comprises error detector circuitry 11 for providing an error bit corresponding to the detection of a departure from the expected data such as loss of framing, parity or failure of the CRC check. It also usually comprises a clock recovery circuit 12 adapted to provide a clock pulse in synchronism with the receive data, as well as a periodic bit generator 13 adapted to provide a signal corresponding to a predetermined expected occurrence in the incoming data stream, for example, a framing pulse.

The monitor circuit of the invention makes use of these conventionally available signals to provide a continuous quality of data indication. It comprises a periodic bit counter 14, an error bit counter 15, and AND gates 17 and 18 interconnected as shown in FIG. 1. The counter 14 is advanced by one count at every coincidental occurrence of a periodic bit from generator 13 and a clock pulse, and counter 15 is advanced by one count at every coincidental occurrence of a clock pulse and an error signal from the detector 11. The overflow output from counter 14 is connected to the clear input of counter 15 and to the reset input of a flip-flop 16 whereas the overflow output of counter 15 is connected to the clear input of counter 14 and to the set input of flip-flop 16. Of course, the maximum count of each of counters 14 and 15 is predetermined depending on the particular application of the monitor circuit. Each of the counters 14 and 15 may conveniently be of the conventional type that resets itself on reaching its maximum count.

In operation, the monitor circuit is effective to provide a flag signal on the Q output of the flip-flop 16 whenever the number of errors exceeds a predetermined ratio of errors to a predetermined amount of data received. This ratio is predetermined by the respective maximum counts of counters 15 and 14. Of course, the absence of a flag signal indicates that the data received meets the predetermined criteria of operation.

The operation of the monitor circuit is depicted in FIG. 2. At every occurrence of a signal bit from the generator 13, the counter 14 is incremented and similarly, at every occurrence of a signal bit from the detector 11, the counter 15 is incremented. When the counter 14 overflows, it clears counter 15 thereby causing both counters to be set to their minimum count. On the other hand, if counter 15 reaches its maximum count before counter 14, its overflow signal will clear counter 14 and set flip-flop 16 to thereby cause a flag signal to be generated. As long as the error rate exceeds the predetermined performance criteria of the transmission link, the counter 15 will continue to reach its maximum count before that of counter 14 and the flip-flop 16 will continue to indicate an alarm signal. The flip-flop 16 will not be reset until the performance criteria has again been met as indicated by the counter 14 reaching its maximum count before counter 15 reaches its maximum count.

Since the quality of transmission on a data link is conventionally expressed in errors per n bits (e.g. x errors/$10^n$ bits) being transmitted on the data link the judicious choice of counters will cause the monitor circuit to provide a flag signal when the predetermined performance criteria are not met.

As is evident from the above description, the invention provides a simple and economical monitor circuit which runs continuously to provide a data quality indication with hysteresis. In fact, the circuit is effective for the detection of any predetermined ratio of events.

What is claimed is:

1. An event ratio detector circuit comprising a first counter means having a predetermined maximum count and being responsive to each event of a first sequence of events for increasing its count by one, and a second counter means having a predetermined maximum count and being responsive to each event of a second sequence of events for increasing its count by one, the overflow output of the first counter means being connected to the clear input of the second counter means, and the overflow output of the second counter means being connected to the clear input of the first counter means, a signal appearing at the overflow output of the second counter means indicating that the ratio of second events to first events as predetermined by the respective maximum counts of the second and first counter means has been exceeded.

2. A circuit as defined in claim 1 and further comprising a flip-flop having its set input connected to the overflow output of the second counter means and its reset input connected to the overflow output of the first counter means, whereby a signal at the Q output of the flip-flop indicates whether or not said predetermined ratio has been exceeded.

3. In a receiver circuit adapted to receive a digital data stream on a transmission link, the receiver circuit comprising a signal generator adapted to provide a periodic bit corresponding to each one of predetermined occurrences in the data stream, an error detector circuit adapted to provide an error bit corresponding to each error of predetermined type detected in the received data and a source of clock pulses synchronized to the bits of the data stream, a circuit for monitoring the performance of the transmission link comprising:
 a first counter means having a predetermined maximum count and being responsive to each of the periodic bits and a clock pulse for increasing its count by one,
 a second counter means having a predetermined maximum count and being responsive to each error bit and a clock pulse for increasing its count by one, the overflow output of the first counter means being connected to the clear input of the first counter means, a signal appearing at said overflow output of the second counter means representing a flag signal to the receiver circuit.

4. A circuit as defined in claim 3 and further comprising a flip-flop having its set input connected to the overflow output of the second counter means and its reset input connected to the overflow output of the first counter means whereby a signal at the Q output of the flip-flop indicates that the transmission link does not meet its performance criteria.

5. A circuit as defined in claim 4 wherein the predetermined maximum count of the first counter means is substantially greater than that of the second counter means.

6. A method of monitoring the performance of a digital transmission system comprising the steps of:
 defining periods during each of which a plurality of errors may occur and for each such period, incrementing the value of a first counter means having a predetermined maximum count,
 in respect of each period of the first counter means, incrementing the value of a second counter means having a predetermined maximum count by one count if at least one error has occurred therein, causing the second counter means to be reset when the first counter means reaches its maximum count and thus resetting itself, and generating an output signal at the output of the second counter means when it reaches its maximum count and thus resetting itself, the output signal being effective for resetting the first counter means, the output signal being indicative that the performance criteria of the transmission system are not met.

7. A method as defined in claim 6 wherein the predetermined maximum count of the first counter means is greater than that of the second counter means.

8. A method as defined in claim 7 and further comprising the step of setting a flag in response to the output signal, whereby an alarm signal may be generated for use by data receiving circuitry.

9. A method as defined in claim 8 and comprising the further step of resetting said flag when the first counter means reaches its predetermined maximum count.

* * * * *